(12) United States Patent
Al-Shafei et al.

(10) Patent No.: US 9,808,840 B2
(45) Date of Patent: Nov. 7, 2017

(54) AIR FILTER ULTRASONIC CLEANING SYSTEMS AND THE METHODS OF USING THE SAME

(71) Applicant: Saudi Arabian Oil Company, Dhahran (SA)

(72) Inventors: Mansour A. Al-Shafei, Saihat (SA); Gasan S. Alabedi, Cheadle (GB); Marwan Rashid Al Dossary, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 478 days.

(21) Appl. No.: 14/515,066

(22) Filed: Oct. 15, 2014

(65) Prior Publication Data

US 2016/0107200 A1  Apr. 21, 2016

(51) Int. Cl.
  *B08B 3/12* (2006.01)
  *B01D 41/04* (2006.01)
(52) U.S. Cl.
  CPC ............... *B08B 3/12* (2013.01); *B01D 41/04* (2013.01)
(58) Field of Classification Search
  CPC .................................. B01D 41/04; B08B 3/12
  See application file for complete search history.

(56) References Cited

U.S. PATENT DOCUMENTS

| | | | |
|---|---|---|---|
| 4,753,257 A | | 6/1988 | Gabriel et al. |
| 5,118,355 A | * | 6/1992 | Browning .............. A46B 17/06 134/1 |
| 5,339,842 A | * | 8/1994 | Bok .................. H01L 21/67057 134/1 |
| 5,361,790 A | * | 11/1994 | Park ....................... B01D 41/04 134/105 |
| 5,467,791 A | * | 11/1995 | Kato ......................... B08B 3/12 134/166 C |
| 6,059,886 A | * | 5/2000 | Shibano .................... B08B 3/12 134/1 |
| 6,394,113 B1 | | 5/2002 | Hatanaka et al. |

(Continued)

FOREIGN PATENT DOCUMENTS

| | | |
|---|---|---|
| CN | 103769382 A | 5/2014 |
| DE | 3627932 A1 | 3/1987 |
| DE | 9307960 U1 | 10/1993 |

OTHER PUBLICATIONS

"Sound Waves Keep Gas Turbines Clean", www.saudiaramco.com/en/home/news/latest-news/2011/sound-waves-keep, 2011.

(Continued)

*Primary Examiner* — Michael Barr
*Assistant Examiner* — Benjamin L Osterhout
(74) *Attorney, Agent, or Firm* — Dinsmore & Shohl LLP

(57) ABSTRACT

An ultrasonic wave washing unit may include a housing including a media inlet, a media outlet, and a bottom surface; a plurality of ultrasonic transducers disposed about and extending from the bottom surface; a support structure including a chair and sleeve, wherein the support structure is coaxially disposed within the housing within the plurality of ultrasonic transducers; wherein the chair is operable to hold an air filter and receive residue from the air filter when washed within the ultrasonic wave washing unit; and the sleeve is operable to engage with the air filter and secure the air filter within the chair.

20 Claims, 6 Drawing Sheets

(56) References Cited

U.S. PATENT DOCUMENTS

| | | |
|---|---|---|
| 6,602,328 B2 | 8/2003 | Doi et al. |
| 6,638,361 B2 | 10/2003 | Hatanaka et al. |
| 2002/0069894 A1 | 6/2002 | Hatanaka et al. |
| 2003/0079607 A1* | 5/2003 | Rigaudeau ............ B01D 41/04 95/212 |
| 2008/0006290 A1 | 1/2008 | Yamanaka et al. |
| 2010/0258147 A1* | 10/2010 | Isobe .................... B01D 41/04 134/151 |
| 2014/0251387 A1* | 9/2014 | Royce ................ B01D 46/0067 134/33 |

OTHER PUBLICATIONS

International Search Report and Written Opinion dated Oct. 23, 2015 pertaining to International Application No. PCT/US2015/044569.

* cited by examiner

US 9,808,840 B2

AIR FILTER ULTRASONIC CLEANING SYSTEMS AND THE METHODS OF USING THE SAME

TECHNICAL FIELD

The present specification generally relates to an ultrasonic cleaning system, and specifically to an ultrasonic cleaning system for cleaning air filters.

BACKGROUND

Currently, air filters are used in gas turbine systems. These air filters generally remove foreign matter, such as dust and dirt, from the air which is to be supplied to the other portions of the gas turbine systems, namely, the compressors, combustors, and turbines. These other portions of the gas turbine systems operate at high speeds and small tolerances, necessitating properly filtered air to operate safely and efficiently. Accordingly, continued improvement to gas turbine systems and related devices is desired.

SUMMARY

In one embodiment, an ultrasonic wave washing unit may include a power source, a housing including a media inlet, a media outlet, and a bottom surface; a plurality of ultrasonic transducers coupled to the power source and disposed about and extending from the bottom surface within the housing; a support structure including a chair, wherein the support structure is coaxially disposed within the plurality of ultrasonic transducers; wherein the chair is operable to hold an air filter and receive residue from the air filter when the air filter is washed within the ultrasonic wave washing unit.

In another embodiment, an ultrasonic cleaning system may include a media source and an ultrasonic wave washing unit. The ultrasonic wave washing unit may include a power source; a housing including a media inlet in communication with the media source, a media outlet, and a bottom surface; a plurality of ultrasonic transducers coupled to the power source and disposed about and extending from the bottom surface within the housing; a support structure comprising a chair and a sleeve, wherein the support structure is coaxially disposed within the plurality of ultrasonic transducers; wherein the chair is operable to hold an air filter and receive residue from the air filter when the air filter is washed within the ultrasonic wave washing unit and the sleeve is operable to engage with the air filter and secure the air filter within the chair.

In another embodiment, a method for cleaning an air filter may include providing an ultrasonic wave washing unit comprising a chair; placing an air filter in the ultrasonic wave washing unit; applying ultrasonic energy to the air filter from the ultrasonic wave washing unit to remove residue from the air filter; collecting the residue within the chair; and removing the air filter from the ultrasonic wave washing unit.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The following text sets forth a broad description of numerous different embodiments of the present disclosure. The description is to be construed as illustrative only and does not describe every possible embodiment since describing every possible embodiment would be impractical, if not impossible, and it will be understood that any feature, characteristic, component, composition, product, step or methodology described herein can be deleted, combined with or substituted for, in whole or part, any other feature, characteristic, component, composition, product, step or methodology described herein. Numerous alternative embodiments could be implemented, using either current technology or technology developed after the filing date of this patent, which would still fall within the scope of the claims.

Figure 1:
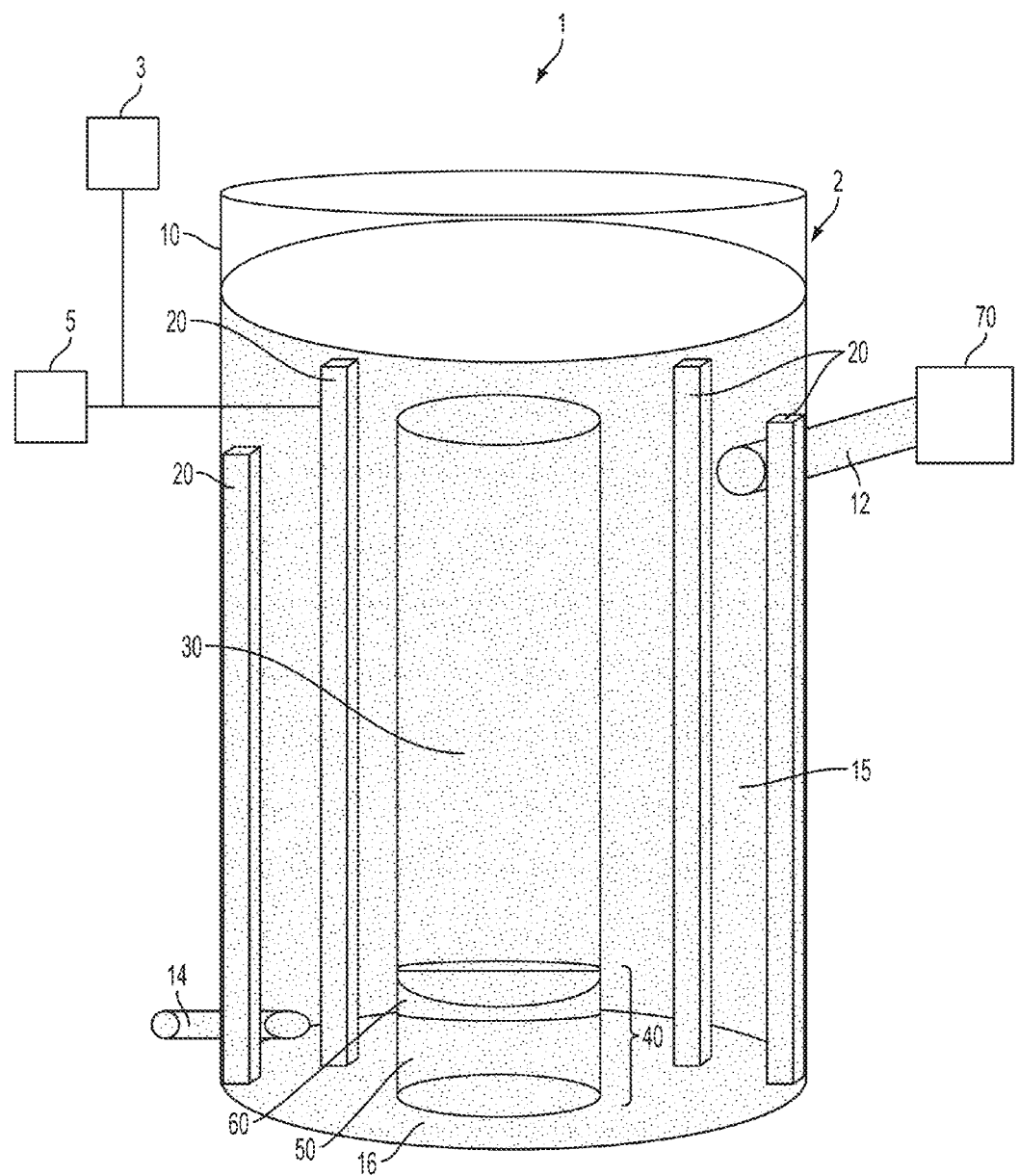
FIG. 1 depicts an ultrasonic cleaning system according to one or more embodiments shown and described herein.

Referring now to FIG. 1, an ultrasonic cleaning system 1 may comprise a media source 70 and an ultrasonic wave washing unit 2. The media source 70 may be a reservoir, a pipe, a connection to municipal water, a storage system with a pump, a gravity fed basin, or any other supply of a media 15. The media source 70 may be external and/or internal to the ultrasonic wave washing unit 2.

"Media" as used herein refers to liquid, semi-solid (e.g., a gel), or solid (e.g., small beads) substances capable of transmitting ultrasonic energy. Examples of the media 15 include, but are not limited to, water, detergents or cleaning agents, and any combination thereof. Examples of forms of water that may be used include salt water, sterile water, deoxygenated water, de-ionized water, or the like.

Figure 3:
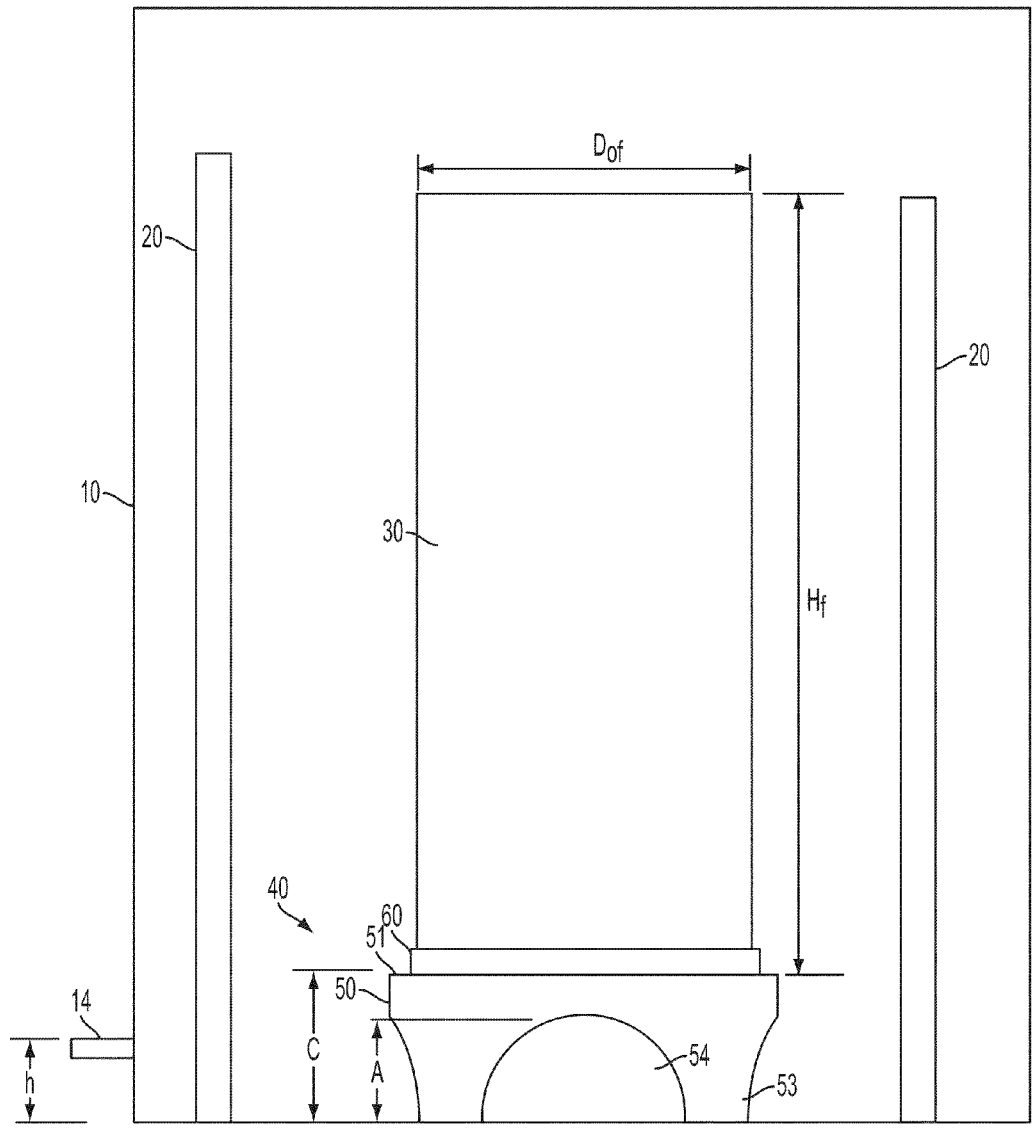
FIG. 3 depicts a side view of the ultrasonic wave washing unit of the ultrasonic cleaning system of FIG. 1.
Figure 4:
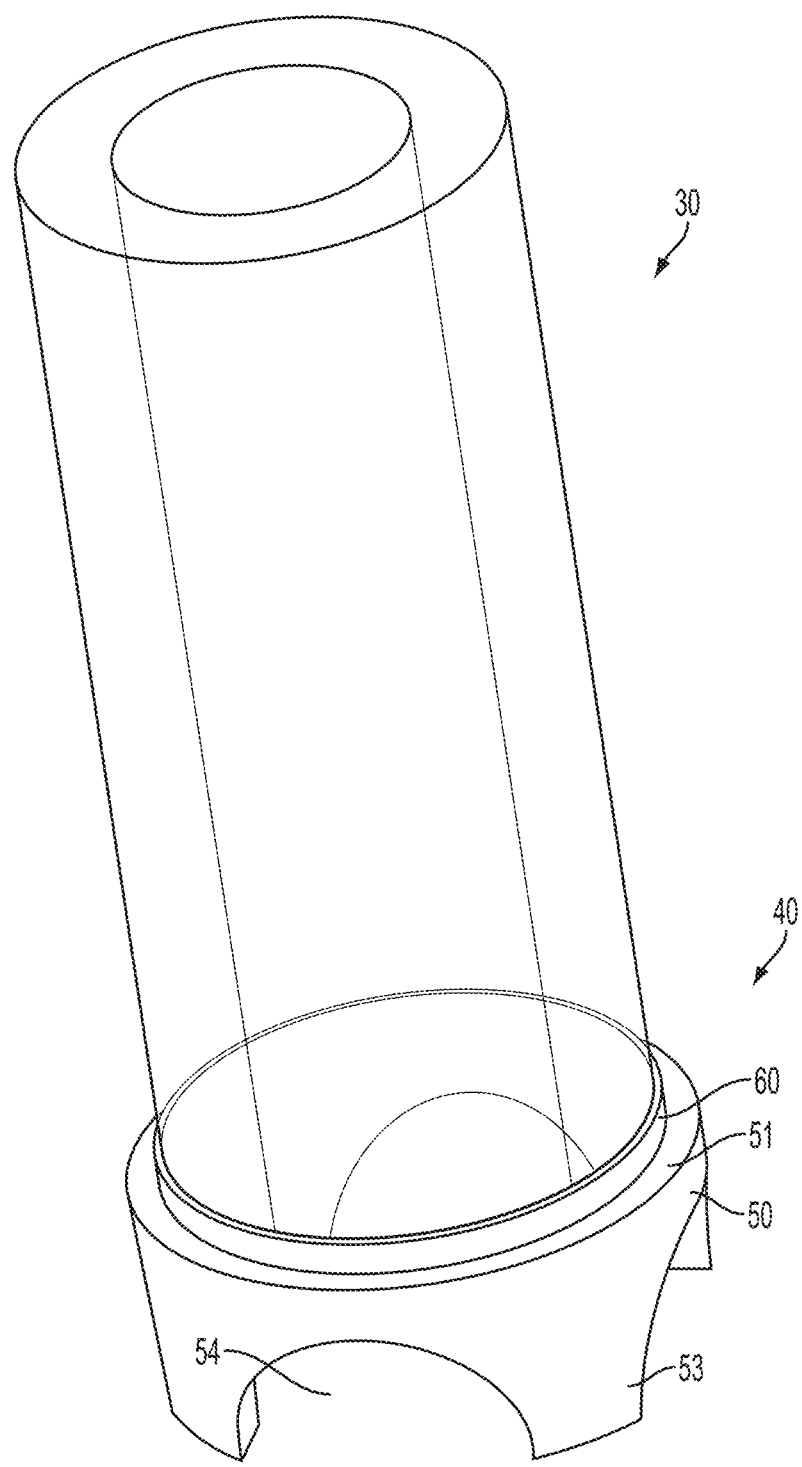
FIG. 4 depicts an isometric view of an air filter and the support structure of FIG. 2A in combination according to one or more embodiments shown and described herein.
Figure 5:
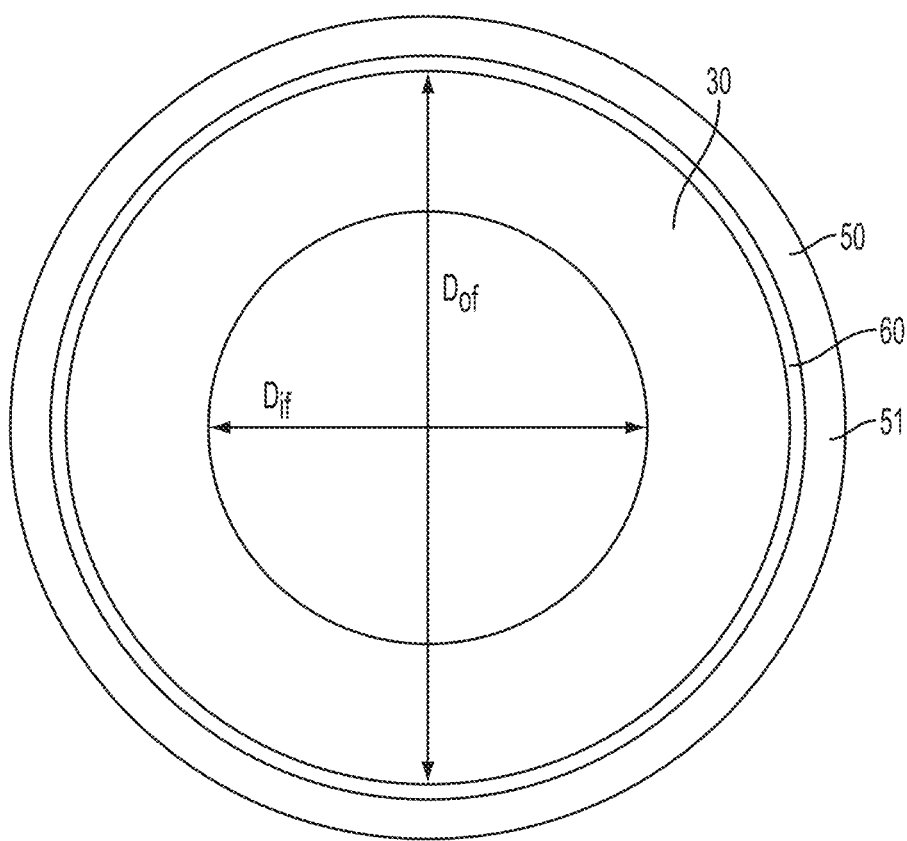
FIG. 5 depicts a top view of the air filter and the support structure of FIG. 4.

Referring collectively to FIGS. 1 and 3, the ultrasonic wave washing unit 2 of the ultrasonic cleaning system 1 is shown. The ultrasonic wave washing unit 2 comprises a power source 5, a housing 10, a plurality of ultrasonic transducers 20, and a support structure 40. The ultrasonic wave washing unit 2 is generally configured to hold the media 15 and to permit immersion of an air filter 30 in the media 15. The ultrasonic wave washing unit 2 is further configured to wash the air filter 30 by using the plurality of ultrasonic transducers 20 to generate and transmit ultrasound energy to clean the air filter 30 immersed in the media 15.

The housing 10 may comprise a media inlet 12 and/or a media outlet 14 to fill the housing 10 with the media 15 or to drain the housing 10 of the media 15. The media inlet 12 may be in communication with the media source 70. In the illustrated embodiment, the media inlet 12 and the media outlet 14 are distinct. Alternatively, the media inlet 12 and the media outlet 14 may be the same element on the housing 10, serving a dual purpose or permitting entry of the media 15 into the housing 10 and dispersing of the media 15 out of the housing 10.

The housing 10 further comprises a bottom surface 16. In the illustrated embodiment, the bottom surface 16 is substantially circular. Alternatively, the bottom surface 16 may be of any shape operable to accept the plurality of ultrasonic transducers 20 positioned along such bottom surface 16 such that the ultrasonic transducers 20 surround the support structure 40. The housing 10 may be made from any appropriate material known in the art such as, for example, metals, plastics, composites, or any combination thereof. In one embodiment, the housing 10 may be made of stainless steel. The housing 10 may be any suitable size and shape that permits the immersion of the air filter 30.

The ultrasonic transducers 20 generally generate and transmit ultrasound energy to clean the air filter 30 positioned within the housing 10. The ultrasonic transducers 20 may be electrically coupled to the power source 5 and disposed about and extend from the bottom surface 16 of the housing 10. Although the power source 5 is only shown in FIG. 1 as coupled to one of the ultrasonic transducers 20, it is understood that the power source 5 could be individually coupled to each ultrasonic transducer 20 or coupled to one ultrasonic transducer 20 and that ultrasonic transducer 20 is coupled to the other ultrasonic transducers 20 in circuit. The power source 5 may be coupled to the ultrasonic transducers 20 via a wire or wirelessly. In the illustrated embodiment, there are four evenly spaced ultrasonic transducers 20 that extend from the bottom surface 16 for the entire height of the air filter 30 and the support structure 40 when in combination. In other embodiments, there may be more or fewer ultrasonic transducers 20 in alternative configurations about the bottom surface 16 of the housing 10 extending to various heights. The ultrasonic wave washing unit 2 may comprise a transducer control unit 3 electronically coupled to the power source 5 and/or the ultrasonic transducers 20 to control the amplitude, frequency, power and/or duration of ultrasonic energy emitted by the ultrasonic transducers 20.

The present disclosure may be embodied in hardware and/or in software (including firmware, resident software, micro-code, etc.). The ultrasonic transducer controller unit 3 may have at least one processor and a computer-readable medium. A computer-usable or the computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In various embodiments, the ultrasonic transducers 20 may be adapted to generate and transmit ultrasonic energy at a frequency of about 18 kHz to about 3 MHz. In some embodiments the frequency may be about 20 kHz to about 40 kHz. In some embodiments, the ultrasonic transducer 20 may be adapted to generate and transmit a power output of about 0.01 watt per $cm^2$ to about 20.0 watts per $cm^2$. In some embodiments, the media 15 placed in the housing 10 allows for and/or assists with uniform transmission of ultrasonic energy from the ultrasonic transducers 20 to the air filter 30 that is immersed and surrounded by the media 15.

In some embodiments, the air filter 30 is generally configured to operate within a gas turbine. The particular materials, dimensions including its height ($h_f$), and configuration of the air filter 30 are beyond the scope of the present disclosure and may be gleaned from conventional or yet-to-be developed teachings on the subject of air filters. One example of the air filter 30 used is the P19-1177 air filter cartridge manufactured by Donaldson Company, Inc, however, any other similarly designed product may be used.

Figure 2A:
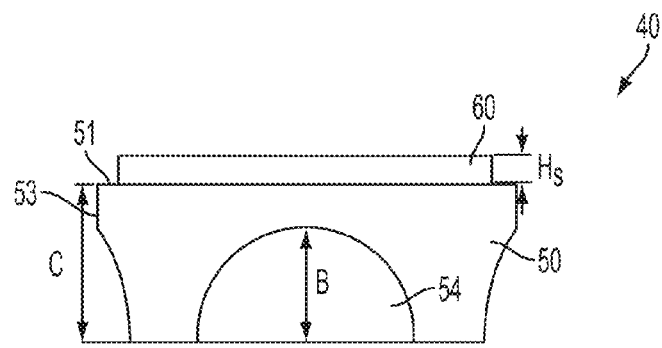
FIG. 2A depicts a side view of an embodiment of a support structure of the ultrasonic cleaning system of FIG. 1.
Figure 2B:
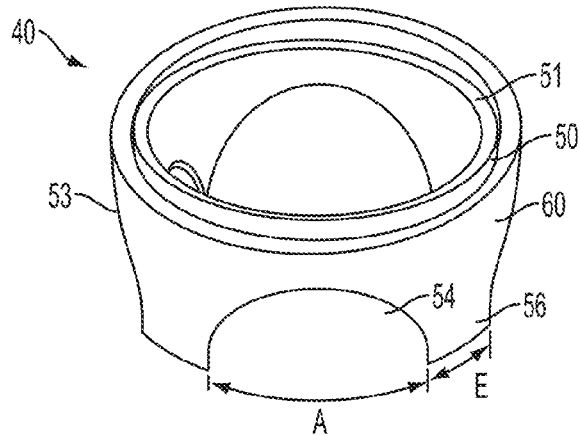
FIG. 2B depicts an isometric view of the support structure of FIG. 2A.
Figure 2C:
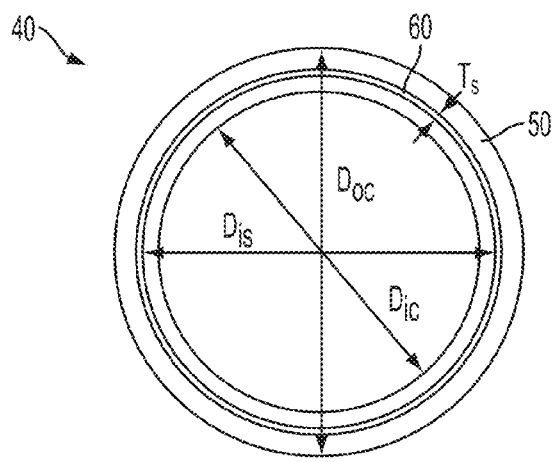
FIG. 2C depicts a top view of the support structure of FIG. 2A.

In the example shown, the support structure 40 comprises a chair 50. In some embodiments, the support structure 40 may be fabricated from stainless steel or any other material capable of engaging the air filter 30 and existing within the selected media 15. As shown in FIG. 1, the support structure 40 is coaxially disposed within the housing 10 such that it is positioned within the plurality of ultrasonic transducers 20. Alternatively, the support structure 40 may be disposed anywhere along a radius of the bottom surface 16. As shown in FIGS. 2A-2C, the chair 50 has an outer chair diameter ($D_{oc}$), an interior chair diameter ($D_{ic}$), a chair height (C), an upper chair surface 51, and an outer chair surface 53. The chair 50 is generally configured to be operable to support and/or hold the air filter 30 and receive residue from the air filter 30 when washed within the ultrasonic wave washing unit 2. The interior chair diameter ($D_{ic}$) may be any value between about 50% of the outer chair diameter (0.5 $D_{oc}$) and about 80% of the outer chair diameter (0.8 $D_{oc}$). In other embodiments, the interior chair diameter ($D_{ic}$) may be any value between about 65% of the outer chair diameter (0.65 $D_{oc}$) and about 76% of the outer chair diameter (0.76 $D_{oc}$). In the illustrated embodiment, the interior chair diameter ($D_{ic}$) is about 30 cm and the outer chair diameter ($D_{oc}$) is about 40 cm. The chair height (C) may be any value between about 10% of the outer chair diameter (0.1 $D_{oc}$) and about 90% of the outer chair diameter (0.90 $D_{oc}$).

The chair 50 may define outer apertures 54 along and disposed within the outer chair surface 53 and a plurality of supports 56. Each of the plurality of supports 56 have a support circumferential width (E) along the bottom of the chair 50. The chair 50 may define a number (n) outer apertures 54 having an aperture height (B) and an aperture circumferential width (A), where n is an integer between about 10% of the outer chair diameter (0.1 $D_{oc}$) and about 60% of the outer chair diameter (0.6 $D_{oc}$). In the illustrated embodiment, the chair 50 defines four (n=4) outer apertures 54 wherein the aperture height (B) is about 11 cm and the aperture circumferential width (A) is about 20 cm. The aperture height (B) may be any value between about 5% the aperture circumferential width (0.05 A) and about 90% of the chair height (0.9 C). The support circumferential width (E) may be any value such that the support circumferential width (E) is greater than about 20% of the aperture circumferential width (0.20 A).

In some embodiments, the media outlet 14 may be disposed at a height (h) along the housing 10, wherein the height (h) is less than the chair height (C). In other embodiments, the media outlet 14 may be disposed in other locations along the housing 10 such that the height (h) is equal to or greater than the chair height (C).

In some embodiments, the support structure 40 may comprise a sleeve 60 that is generally configured to be operable to engage with the air filter 30 and secure the air filter 30 upon the chair 50. Alternatively, the support structure 40 may comprise portions of the chair 50 configured to directly engage with the air filter 30, such as snap fit mechanisms, wedges, hasps, etc. In embodiments that include the sleeve 60, the sleeve 60 extends from the upper chair surface 51 and has a sleeve thickness ($T_s$), a sleeve height (HO, and an inner sleeve diameter ($D_{is}$). The sleeve thickness ($T_s$) in the illustrated embodiment is about 5 mm. The sleeve height ($H_s$) may be between about 2% of the height of the air filter 30 (0.02 $h_f$) and about 15% of the height of the air filter 30 (0.15 $h_f$). In the illustrated embodiment, the sleeve height ($H_s$) is about 3 cm compared to the selected air filter 30 with a height ($h_f$) of about 78 cm. The inner sleeve diameter ($D_{is}$) is between the inner chair diameter ($D_{ic}$) and the outer diameter of the selected air filter 30 ($D_{of}$). In the illustrated embodiment, the sleeve 60 is centered on the upper chair surface 51 of the chair 50 and has a diameter ($D_{is}$) equal to ($D_{oc}+D_{ic}$)/2+$T_s$, which equals about 35 cm.

Figure 6:
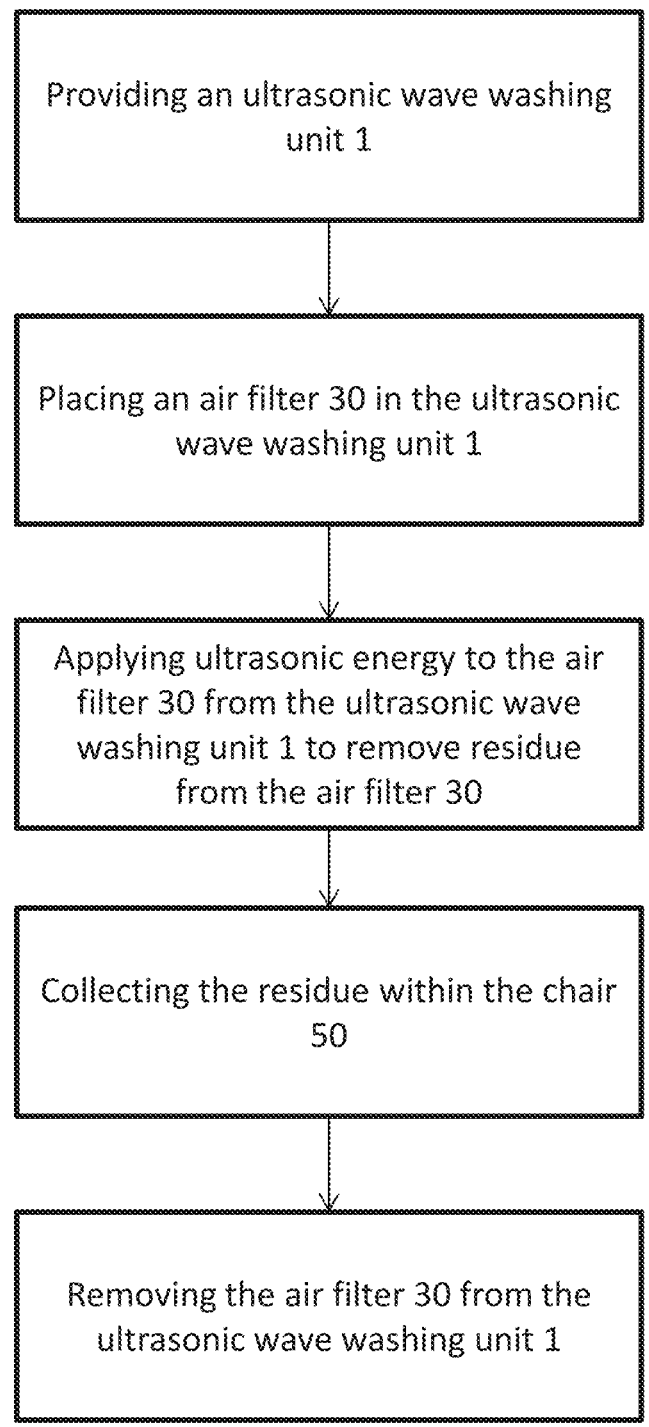
FIG. 6 depicts a flow chart of the method of cleaning an air filter according to one or more embodiments shown and described herein.

As shown in FIG. 6, a method 100 of using the ultrasonic wave washing unit 2 is contemplated. The method 100 comprises providing the ultrasonic wave washing unit 2 comprising the chair 50 shown as 102; placing the air filter 30 in the ultrasonic wave washing unit 2 shown as 104; applying ultrasonic energy to the air filter 30 from the ultrasonic wave washing unit 2 to remove residue from the air filter 30 shown as 106; collecting the residue within the chair 50 shown as 108; and removing the air filter 30 from the ultrasonic wave washing unit 2 shown as 110.

The housing 10 of the ultrasonic wave washing unit 2 may be filled with the media 15 before or after the placing of the air filter 30 in the ultrasonic wave washing unit 2. In one example, the media 15 may more specifically comprise solid detergent and de-ionized water. Alternatively, the media 15 may comprise pure water. Additionally or alternatively, during one or more of the steps of the method 100, the media 15 may be at any temperature between room temperature and about 50° C. Additionally, the different compositions of the media 15 may be introduced at time intervals after the air filter 30 has been placed in the ultrasonic wave washing unit 2. For example, detergent may be added to the media 15 five minutes into the step of using the ultrasonic wave washing unit 2 to apply ultrasonic energy to remove residue from the air filter 30.

The ultrasonic wave washing unit 2 to may apply ultrasonic energy to remove residue from the air filter 30 for any amount of time sufficient to remove residue from the air filter 30. In some embodiments, the ultrasonic wave washing unit 2 may apply ultrasonic energy continuously and at a constant amplitude, frequency, power and/or duration. Alternatively, the ultrasonic wave washing unit 2 may vary the amplitude, frequency, power and/or duration of the ultrasonic energy provided to the air filter 30.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that terms like "preferably," "generally," and "typically" are not utilized herein to limit the scope of the appended claims or to imply that certain features are critical, essential, or even important to the structure or function of the claimed subject matter. Rather, these terms are merely intended to highlight alternative or additional features that may or may not be utilized in a particular embodiment.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Certain terminology is used in the disclosure for convenience only and is not limiting. The words such as "left", "right", "front", "back", "upper", and "lower" designate directions in the drawings to which reference is made. The terminology includes the words noted above as well as derivatives thereof and words of similar import.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An ultrasonic wave washing unit comprising:
   a power source;
   a housing comprising a media inlet, a media outlet, and a bottom surface;
   a plurality of ultrasonic transducers coupled to the power source and disposed about and extending from the bottom surface within the housing; and
   a support structure comprising a chair, wherein the support structure is disposed within the housing within the plurality of ultrasonic transducers;
   wherein the chair is operable to hold an air filter and receive residue from the air filter when the air filter washed within the ultrasonic wave washing unit, wherein the chair is configured to evacuate residue from the housing through the media outlet.

2. The ultrasonic wave washing unit of claim 1, wherein the chair comprises supports and defines apertures through which the received residue may flow.

3. The ultrasonic wave washing unit of claim 2, wherein the chair comprises four supports and defines four apertures.

4. The ultrasonic wave washing unit of claim 1, wherein the chair comprises stainless steel.

5. The ultrasonic wave washing unit of claim 1, wherein the support structure is coaxially disposed within the housing.

6. The ultrasonic wave washing unit of claim 1, wherein the media inlet and the media outlet are the same element.

7. The ultrasonic wave washing unit of claim 1, wherein the plurality of ultrasonic transducers emit ultrasonic energy with a distinct amplitude, frequency, power and/or duration.

8. The ultrasonic wave washing unit of claim 1, wherein the ultrasonic transducers are evenly spaced within the housing.

9. The ultrasonic wave washing unit of claim 1, wherein the support structure further comprises a sleeve operable to engage with the air filter and secure the air filter within the chair.

10. The ultrasonic wave washing unit of claim 1, wherein the media outlet is disposed below the support structure.

11. An ultrasonic cleaning system comprising:
a media source;
a power source;
an ultrasonic wave washing unit, wherein the ultrasonic wave washing unit comprises:
a housing comprising a media inlet in communication with the media source, a media outlet, and a bottom surface;
a plurality of ultrasonic transducers coupled to the power source and disposed about and extending from the bottom surface within the housing; and
a support structure comprising a chair and a sleeve, wherein the support structure is coaxially disposed within the housing within the plurality of ultrasonic transducers;
wherein the chair is operable to hold an air filter and receive residue from the air filter when washed within the ultrasonic wave washing unit;
wherein the chair is configured to evacuate residue from the housing through the media outlet; and
wherein the sleeve is operable to engage with the air filter and secure the air filter within the chair.

12. The ultrasonic cleaning system of claim 11, further comprising a transducer control unit.

13. The ultrasonic cleaning system of claim 12, wherein the transducer control unit is coupled to the power source.

14. The ultrasonic cleaning system of claim 11, wherein the media outlet is in communication with the media source.

15. A method for cleaning an air filter, comprising:
providing an ultrasonic wave washing unit comprising a housing, a chair, and a media outlet;
placing an air filter in the ultrasonic wave washing unit;
using the chair to hold the air filter in the ultrasonic wave washing unit;
applying ultrasonic energy to the air filter from the ultrasonic wave washing unit to remove residue from the air filter;
collecting residue within the chair configured to evacuate residue from the housing through the media outlet;
evacuating residue from the chair through the media outlet; and
removing the air filter from the ultrasonic wave washing unit.

16. The method of claim 15, further comprising the step of filling the ultrasonic wave washing unit with media.

17. The method of claim 16, wherein the ultrasonic wave washing unit is filled with media before the air filter is placed in the ultrasonic wave washing unit.

18. The method of claim 16, wherein the ultrasonic wave washing unit is filled with media after the air filter is placed in the ultrasonic wave washing unit.

19. The method of claim 16, further comprising adding detergent to the media after a time delay.

20. The method of claim 16, wherein the media is held at a controlled temperature.

* * * * *